UNITED STATES PATENT OFFICE.

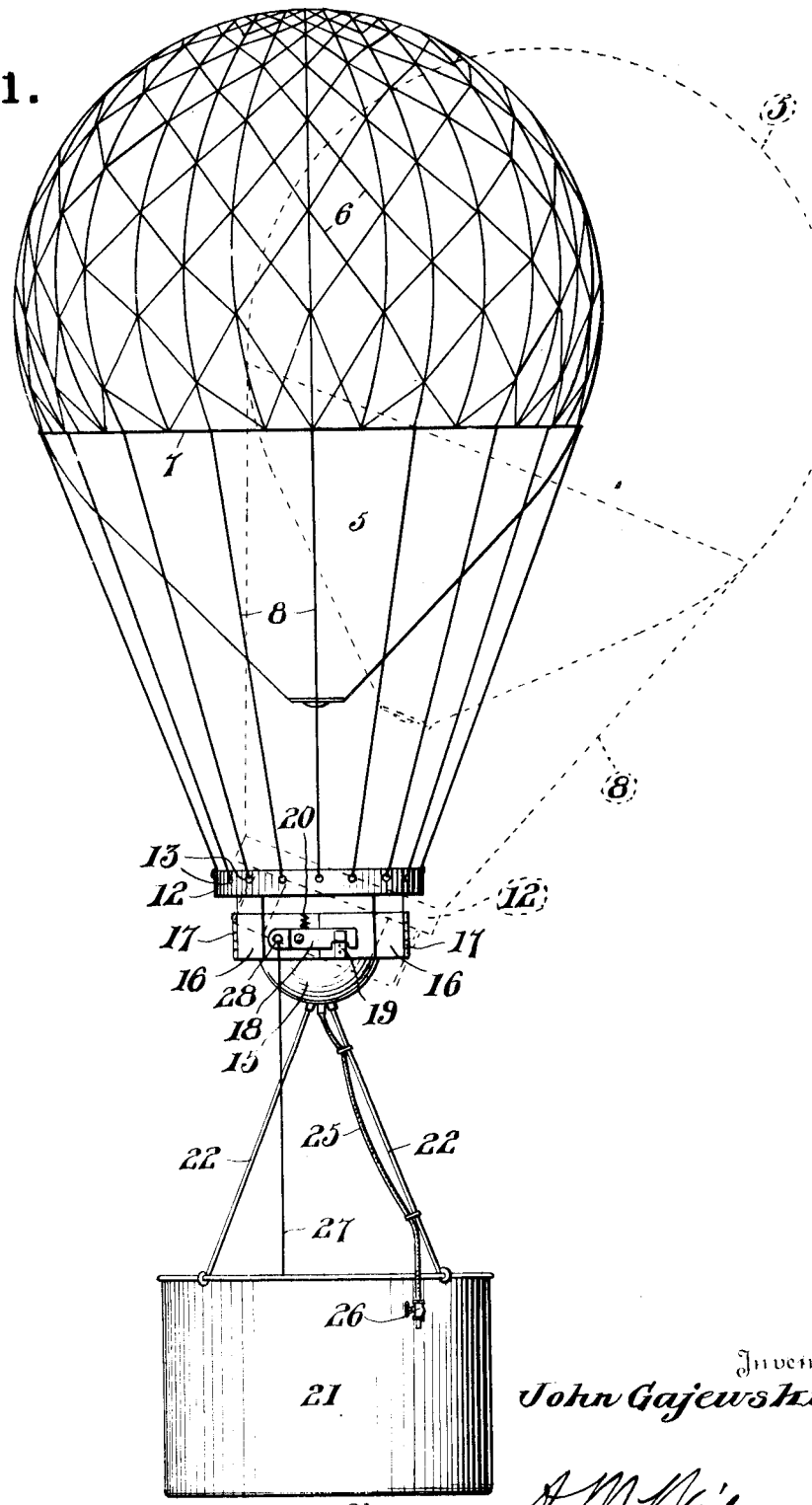

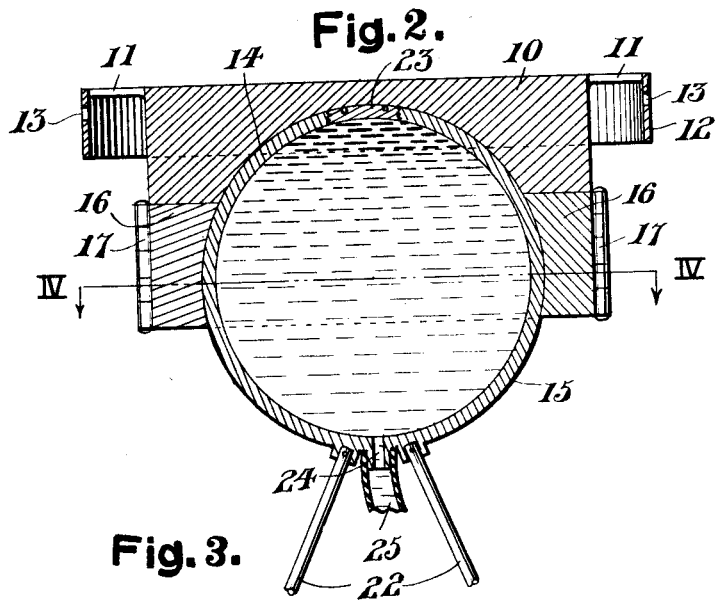
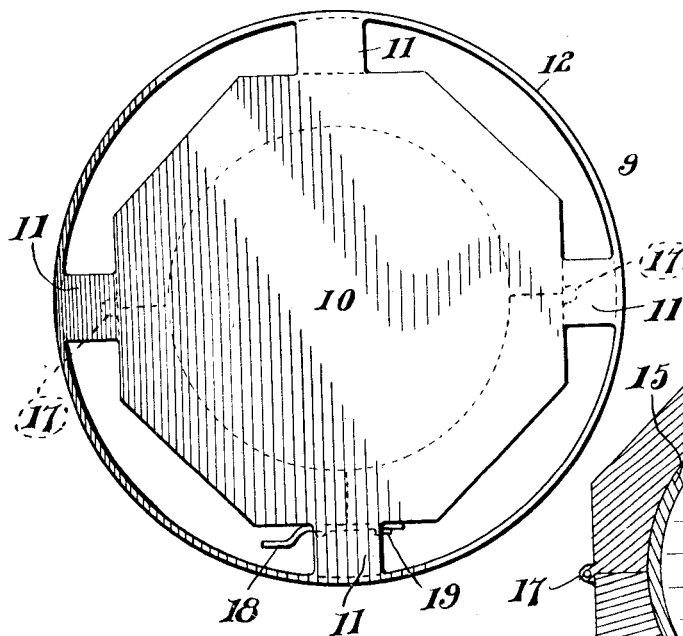
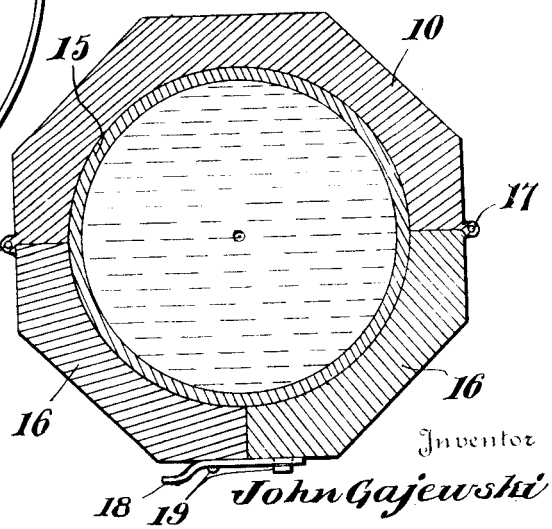

JOHN GAJEWSKI, OF TWO RIVERS, WISCONSIN.

BALLOON.

1,180,584.  Specification of Letters Patent.  Patented Apr. 25, 1916.

Application filed September 13, 1915. Serial No. 50,397.

*To all whom it may concern:*

Be it known that I, JOHN GAJEWSKI, a subject of the Emperor of Austria-Hungary, residing at Two Rivers, in the county of Manitowoc and State of Wisconsin, have invented certain new and useful Improvements in Balloons, of which the following is a specification.

This invention relates to certain new and useful improvements in balloons.

The primary object of the present invention is to provide a balloon in which the suspending carriage or car for persons has a universal connection with the balloon or gas bag so that the passenger car will always assume a vertical position.

A further object of the invention is to provide a balloon in which the car is suspended from the balloon section by a ball and socket connection and in which the ball member is of hollow construction and adapted to contain water or other fluid to act as a ballast, the flow of water from the ball being controlled by valve mechanism to reduce the weight of the car to afford a more rapid ascent of the balloon.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—Figure 1 is a side elevational view of a balloon built in accordance with the present invention. Fig. 2 is a vertical cross-sectional view of the ball and socket joint between the balloon section and the car section illustrating the particular construction of ball and socket joint. Fig. 3 is a top plan view of the socket member detached from the balloon section, and, Fig. 4 is a horizontal sectional view taken on line IV—IV of Fig. 2 illustrating the manner of retaining the ball within the socket member.

Briefly described, the present invention aims to provide a balloon in which the passenger car or carrier has a universal connection with the balloon section so that the car will always assume a vertical position, the principal features of the present invention relating to the universal connection. This joint is in the form of a ball and socket in which the ball is of hollow construction and is adapted to contain water or other ballasting fluid that may be readily emptied from the ball to reduce the weight of the device and permit an even and easy ascent.

Referring more in detail to the accompanying drawings and particularly to Fig. 1, the reference numeral 5 designates a gas bag that has the usual laced cord covering 6 that terminates at the point 7 and continues downwardly as at 8 providing guy ropes for the balloon and are connected at their lower ends to the socket member 9. The socket member is more clearly shown in detail in Figs. 2 and 3 and includes the main body-portion 10 preferably of solid construction and carrying radial extensions 11 that support at their outer ends an annular band 12. Openings 13 are provided in the band 12 at suitably spaced points and within which the lower ends of the guy ropes 8 are received and fastened. The lower face of the socket member 9 is recessed or hollowed as at 14 to provide a seat for the ball 15, the lower end of the socket member extending slightly below a medial line of the ball so that the ball will be retained therein. As shown in Figs. 2 and 4 the lower half of the socket member 9 at one side thereof is formed of a pair of swinging members 16 hinged as at 17 to the main body-portion of the socket member 9, the said swinging members moving in horizontal directions to permit the ball member 15 to be received in the socket 14 and when so assembled, the swinging members are closed to the position shown in Fig. 4 and the clasp 18 pivoted to one of the members 16 moved to engage the keeper 19 carried by the opposing swinging member to lock the said members and prevent the ball 15 from dropping from the socket. A spring 20 is employed to hold the clasp 18 into engagement with the keeper 19 to prevent accidental displacement of the same and injury to the occupants of the suspended car.

A passenger car 21 is supported by means of suspending rods 22 connected at their lower ends to the said car and at their upper ends to the bottom face of the ball 15. The ball is of hollow construction and has an opening in its upper side that is closed by a screw plug 23, the said opening facilitating the filling of the ball with water or other ballasting fluid. A nipple outlet 24 is arranged at the lower side of the ball and preferably at a point within the suspending rods 22 and has connected thereto a flexible tubing 25 that may be loosely connected to one of the suspending rods to prevent unnecessary swinging of the same while the lower end of the tube is provided with a controlling valve 26.

From the above detailed description of the invention it is believed that the construction and operation thereof will be readily apparent, it being understood that the ball member 15 is filled with water or other ballasting fluid through the upper end thereof before the ball is assembled with the socket member 9. When so filled, the ball is positioned in the socket and the swinging member 16 moved to the position shown in Fig. 4 in which the locking clasp 18 is resiliently held in contact with the keeper 19 to lock the ball in the socket. If it be desired that the balloon ascend with sudden rapidity, the valve 26 may be opened to empty a portion of the contents of fluid within the hollow ball 15 to reduce the weight of the machine. The car 21 and ball 15 carried thereby may be detached from the socket member at a point from within the car through the medium of the hanging cable or rope 27 that is connected at its upper end as at 28 to the outer end of the clasp 18 and by pulling the said rope, the clasp is disconnected from the keeper 19 and the ball member readily detached from the socket member.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. A balloon including a balloon section and a car section, a universal ball and socket joint between the two sections, said ball member being of hollow construction and adapted to contain a ballasting fluid, and means controlled from a point within the car for emptying the contents of the hollow ball.

2. A balloon including a balloon section and a car section, a ball and socket joint between the two sections, said socket member including a main body-portion, radial arms carried thereby, an annular band carried by the outer ends of said arms, guy ropes connecting the balloon section to the said band, said socket member having a circular recess in the lower end thereof extending slightly below the medial line of the ball, swinging members carried by said socket member for locking the ball therein, said ball being of hollow construction and adapted to contain a ballasting fluid, and means for emptying the fluid from said ball.

3. A balloon including a balloon section and a car section, a universal ball and socket joint between the two sections, said ball being of hollow construction and adapted to contain a ballasting fluid, and means for emptying at will the fluid from the ball.

4. In combination with a balloon including a balloon section and a car section, a ball and socket joint between the sections, said ball member constructed to contain fluid ballasting means for the balloon.

In testimony whereof I affix my signature.

JOHN GAJEWSKI.